US012370752B2

(12) United States Patent
Mitrovic et al.

(10) Patent No.: US 12,370,752 B2
(45) Date of Patent: Jul. 29, 2025

(54) USE OF REMOVABLE METAL FRAMES TO CONTROL INDUCTION WELDING OF THERMOPLASTIC COMPOSITE EDGES

(71) Applicant: ROHR, INC., Chula Vista, CA (US)

(72) Inventors: Milan Mitrovic, Del Mar, CA (US); Jonathan S. Huang, Pasadena, CA (US); Michael Van Tooren, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 553 days.

(21) Appl. No.: 17/567,736

(22) Filed: Jan. 3, 2022

(65) Prior Publication Data

US 2023/0211571 A1 Jul. 6, 2023

(51) Int. Cl.
*B29C 65/00* (2006.01)
*B29C 65/32* (2006.01)
*B29L 31/30* (2006.01)

(52) U.S. Cl.
CPC ............ *B29C 66/004* (2013.01); *B29C 65/32* (2013.01); *B29C 66/131* (2013.01); *B29C 66/7392* (2013.01); *B29L 2031/3076* (2013.01)

(58) Field of Classification Search
CPC ..... B29C 66/004; B29C 65/32; B29C 66/131; B29C 66/7392; B29C 66/7212; B29C 66/7422; B29C 66/74283; B29C 65/364; B29C 66/742; B29C 66/8122; B29C 65/3668; B29C 65/3684; B29C 66/003; B29C 66/0044; B29C 66/112; B29C 66/348; B29C 66/524; B29C 66/532; B29C 66/61; B29C 66/721; B29C 66/73921; B29C 65/46; B29C 65/18; B29L 2031/3076; B29L 2031/3082; B29L 2031/3085

See application file for complete search history.

(56) References Cited

U.S. PATENT DOCUMENTS

| | | | |
|---|---|---|---|
| 5,710,412 A | 1/1998 | Hansen | |
| 5,935,475 A | 8/1999 | Scoles et al. | |
| 6,043,469 A | 3/2000 | Fink et al. | |
| 6,602,810 B1 | 8/2003 | Christensen et al. | |
| 6,613,169 B2 | 9/2003 | Georgeson et al. | |
| 7,126,096 B1 | 10/2006 | Matsen et al. | |
| 10,160,172 B2 | 12/2018 | Huang et al. | |
| 10,369,750 B2 | 8/2019 | Soccard | |
| 2016/0136879 A1 | 5/2016 | Matsen et al. | |
| 2020/0276769 A1 | 9/2020 | Van Ingen et al. | |

FOREIGN PATENT DOCUMENTS

| | | | |
|---|---|---|---|
| CN | 211375048 | 8/2020 | |
| EP | 1011182 A1 * | 6/2000 | ............ F03D 80/00 |
| WO | WO-2018097716 A1 * | 5/2018 | |

OTHER PUBLICATIONS

European Patent Office, European Search Report dated Jun. 16, 2023 in Application No. 23150201.4.

* cited by examiner

*Primary Examiner* — Christopher W Raimund
(74) *Attorney, Agent, or Firm* — SNELL & WILMER L.L.P.

(57) ABSTRACT

Systems and methods for induction welding a stiffener to a thermoplastic composite structure using a removeable metal mask to reduce excess heat along the edges of the stiffener generated from an electromagnetic field of an induction welding tool.

17 Claims, 9 Drawing Sheets

USE OF REMOVABLE METAL FRAMES TO CONTROL INDUCTION WELDING OF THERMOPLASTIC COMPOSITE EDGES

FIELD

The present disclosure relates generally to induction welding of thermoplastic composite structures, and more specifically to systems and methods for induction welding a stiffener to a thermoplastic composite structure.

BACKGROUND

Many aircraft thermoplastic composite structures are formed using stiffeners comprised of a thermoplastic, a thermoplastic material, a metallic material, or the like to reinforce or stiffen the structure. These stiffeners typically provide the structure with resistance to compression buckling or bending, making the structure desirably less flexible when put under a shearing, tensile, or compressive stress, or the like. These stiffeners are joined to the thermoplastic structure by induction welding. Induction welding utilizes electromagnetic induction to heat a workpiece. An induction coil is energized with electrical current which generates an electromagnetic field that heats a workpiece and binds it to a thermoplastic structure. As a stiffener is laid up in a thermoplastic structure, induction welding can generate eddy currents which can heat the edges of the stiffener, leading to higher temperatures that can damage the thermoplastic structure.

SUMMARY

A method of joining a first workpiece to a second workpiece is disclosed herein. In various embodiments the method can comprise positioning the second workpiece on top of the first workpiece, wherein the second workpiece is configured to at least partially overlay the top of the first workpiece. In various embodiments, the method can comprise positioning a removable metal mask on the top of the first workpiece. The removable metal mask can comprise a metal mesh configured to mask the first workpiece and expose the second workpiece through a workpiece opening disposed within the metal mesh. In various embodiments, the method can comprise induction welding the first workpiece to the second workpiece at a welding region. The induction welding can further comprise operating an induction welding tool configured to weld at the welding region of the second workpiece. In various embodiments, the induction welding tool can operate for a length of the second workpiece for a welding period.

In various embodiments, the induction welding tool can comprise an induction welding tool surface located proximate the second workpiece. In various embodiments, a coil can be located proximate the first workpiece. The coil can be configured to energize with alternating current to generate an electromagnetic field. The electromagnetic field can be configured to heat the welding region. The heat generated by the coil can be configured to weld at a welding temperature, by the induction welding tool, the second workpiece to the first workpiece at the welding region. In various embodiments, the method can further comprise removing the removable metal mask.

In various embodiments of the method, the metal mesh can comprise an electrical conductivity between 1.5 million siemens per meter and 20 million siemens per meter. In further embodiments of the method, the metal mesh can comprise at least one of copper and aluminum. In various embodiments of the method, the welding temperature can be between 200° C. and 500° C.

In various embodiments of the method, the induction welding the first workpiece to the second workpiece can further comprise induction welding a thermoplastic composite structure to the second workpiece. In various embodiments of the method, the thermoplastic composite structure further can comprise a thermoplastic composite skin, wherein the thermoplastic composite skin can be configured to weld to the second workpiece.

In various embodiments of the method, the induction welding the thermoplastic composite structure to the second workpiece can further comprise induction welding the thermoplastic composite structure to a stiffener. In various embodiments, the stiffener can comprise a stiffener cap, a stiffener web disposed along the length of the stiffener cap, and a stiffener flange disposed outward from the stiffener web. In various embodiments, the stiffener flange can overlay the thermoplastic composite skin.

In various embodiments of the method, the induction welding the stiffener flange to the thermoplastic composite structure can further comprise the stiffener flange at least partially overlaying the thermoplastic composite skin of the thermoplastic composite structure. The stiffener flange can be configured to weld to the thermoplastic composite skin of the thermoplastic composite structure at the welding region.

In various embodiments of the method, the induction welding the stiffener flange to the thermoplastic composite structure can further comprise the electromagnetic field being configured to heat the stiffener flange and the thermoplastic composite skin at the welding region. The heat generated by the coil can be configured to weld, by the induction welding tool, the stiffener flange to the thermoplastic composite skin at the welding region.

An exemplary method of joining a first workpiece to a second workpiece is disclosed herein. In various embodiments, the method can comprise positioning the second workpiece on top of the first workpiece, wherein the second workpiece is configured to at least partially overlay the top of the first workpiece. In various embodiments, the method can comprise positioning a first removable metal mask on the top of the first workpiece and proximate the second workpiece. The first removable metal mask can comprise a metal mesh configured to at least partially mask the first workpiece.

In various embodiments, the method can comprise positioning a second removable metal mask on the top of the first workpiece and proximate the second workpiece. The second removable metal mask can comprise the metal mesh configured to at least partially mask the first workpiece.

In various embodiments, the method can comprise induction welding the first workpiece to the second workpiece at a welding region. In various embodiments, the induction welding can further comprise operating an induction welding tool configured to weld at the welding region of the second workpiece. The induction welding tool can operate for a length of the second workpiece for a welding period. In various embodiments, the induction welding tool can comprise an induction welding tool surface located proximate the second workpiece. In various embodiments, the induction welding tool can comprise a coil located proximate the first workpiece. The coil can be configured to energize with alternating current to generate an electromagnetic field. The electromagnetic field can be configured to heat the welding region. The heat generated by the coil can be configured to weld at a welding temperature, by the induction welding tool, the second workpiece to the first workpiece at the welding region. In various embodiments, the method can comprise removing the first removable metal mask and the second removable metal mask.

In various embodiments of the method, the metal mesh can comprise an electrical conductivity between 1.5 million siemens per meter and 20 million siemens per meter. In further embodiments of the method, the metal mesh can comprise at least one of copper and aluminum. In various embodiments of the method, the welding temperature can be between 200° C. and 500° C.

In various embodiments of the method, the induction welding the first workpiece to the second workpiece can further comprise induction welding a thermoplastic composite structure to the second workpiece. In various embodiments of the method, the thermoplastic composite structure further can comprise a thermoplastic composite skin, wherein the thermoplastic composite skin can be configured to weld to the second workpiece.

In various embodiments of the method, the induction welding the thermoplastic composite structure to the second workpiece can further comprise induction welding the thermoplastic composite structure to a stiffener. In various embodiments, the stiffener can comprise a stiffener cap, a stiffener web disposed along the length of the stiffener cap, and a stiffener flange disposed outward from the stiffener web. In various embodiments, the stiffener flange can overlay the thermoplastic composite skin.

In various embodiments of the method, the induction welding the stiffener flange to the thermoplastic composite structure can further comprise the stiffener flange at least partially overlaying the thermoplastic composite skin of the thermoplastic composite structure. The stiffener flange can be configured to weld to the thermoplastic composite skin of the thermoplastic composite structure at the welding region.

In various embodiments of the method, the induction welding the stiffener flange to the thermoplastic composite structure can further comprise the electromagnetic field being configured to heat the stiffener flange and the thermoplastic composite skin at the welding region. The heat generated by the coil can be configured to weld, by the induction welding tool, the stiffener flange to the thermoplastic composite skin at the welding region.

A removable metal mask for use in induction welding of a first workpiece to a second workpiece is disclosed herein. In various embodiments, the removable metal mask can comprise a metal mesh, which can comprise at least one of copper and aluminum. In various embodiments, the metal mesh can be configured to surround a perimeter of the second workpiece. In various embodiments, a workpiece opening can be disposed within the metal mesh, the workpiece opening can be configured to mask the first workpiece and at least partially expose the second workpiece.

In various embodiments, the metal mesh can comprise an electrical conductivity between 1.5 million siemens per meter and 20 million siemens per meter. In various embodiments, the removable metal mask can further comprise a metal frame, wherein the metal mesh can be disposed within the metal frame.

In various embodiments of the method, induction welding the thermoplastic composite structure to the second workpiece can further comprise induction welding the thermoplastic composite structure to a stiffener. In various embodiments, the stiffener can comprise a stiffener cap, a stiffener web disposed along the length of the stiffener cap, and a stiffener flange disposed outward from the stiffener web. In various embodiments, the stiffener flange can overlay the thermoplastic composite skin.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
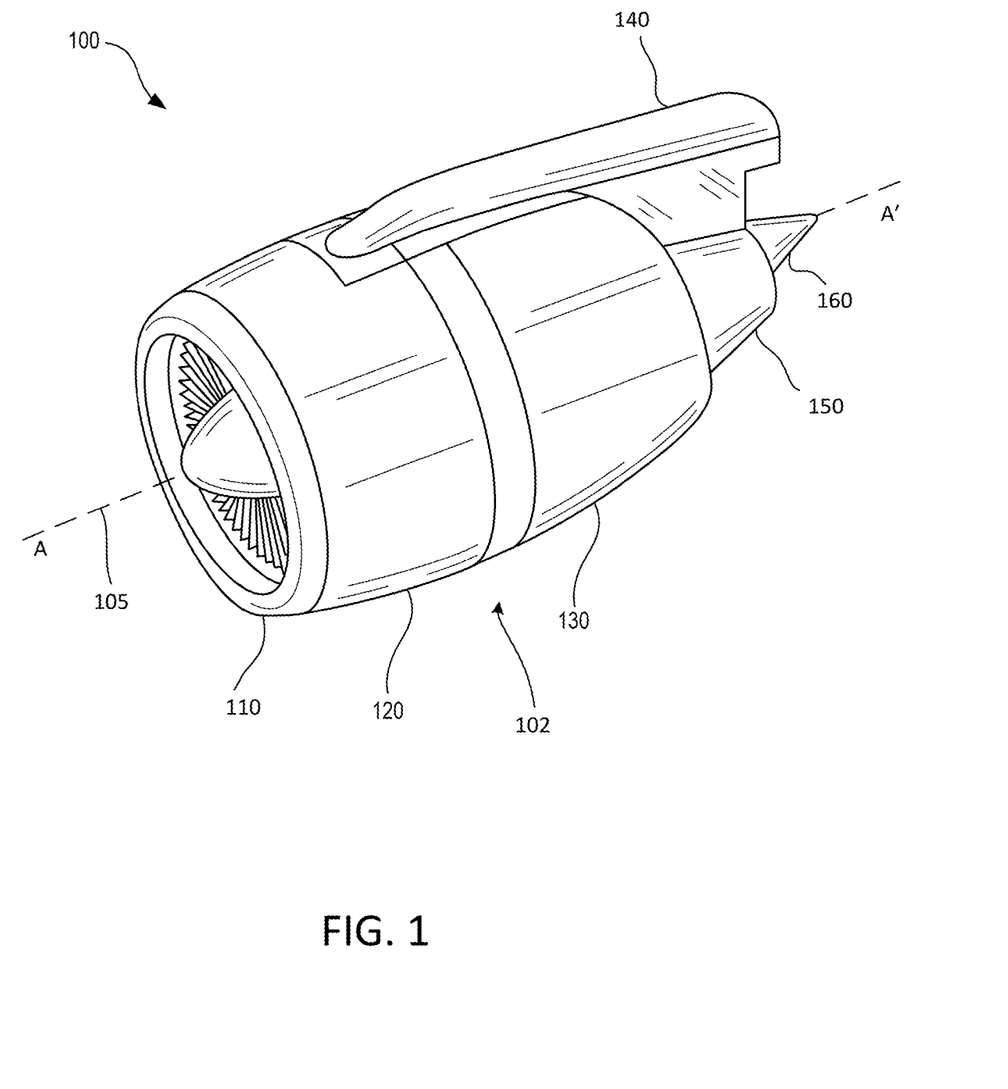
FIG. 1 illustrates an aircraft engine nacelle having a fan cowl on the outside, in accordance with various embodiments.

FIG. 1 illustrates a nacelle 100 for a gas turbine engine according to various embodiments. The nacelle for a gas turbine engine may be suitable for an aircraft. The nacelle 100 can comprise a centerline A-A' 105. Nacelle 100 can comprise an inlet 110, a fan cowl 120, and a thrust reverser 130. The fan cowl 120 can comprise a stiffener 102 configured to reinforce the fan cowl 120. In various embodiments, stiffeners as disclosed herein can be comprised of a thermoplastic, a thermoplastic composite material, a metallic material, or the like. Stiffener 102 comprises a thermoplastic composite material. Nacelle 100 can be coupled to a pylon 140, which can mount the nacelle 100 to an aircraft wing or aircraft body. A nozzle 150 can surround a center body 160, between which an engine exhaust stream exits to provide additional thrust.

Figure 2:
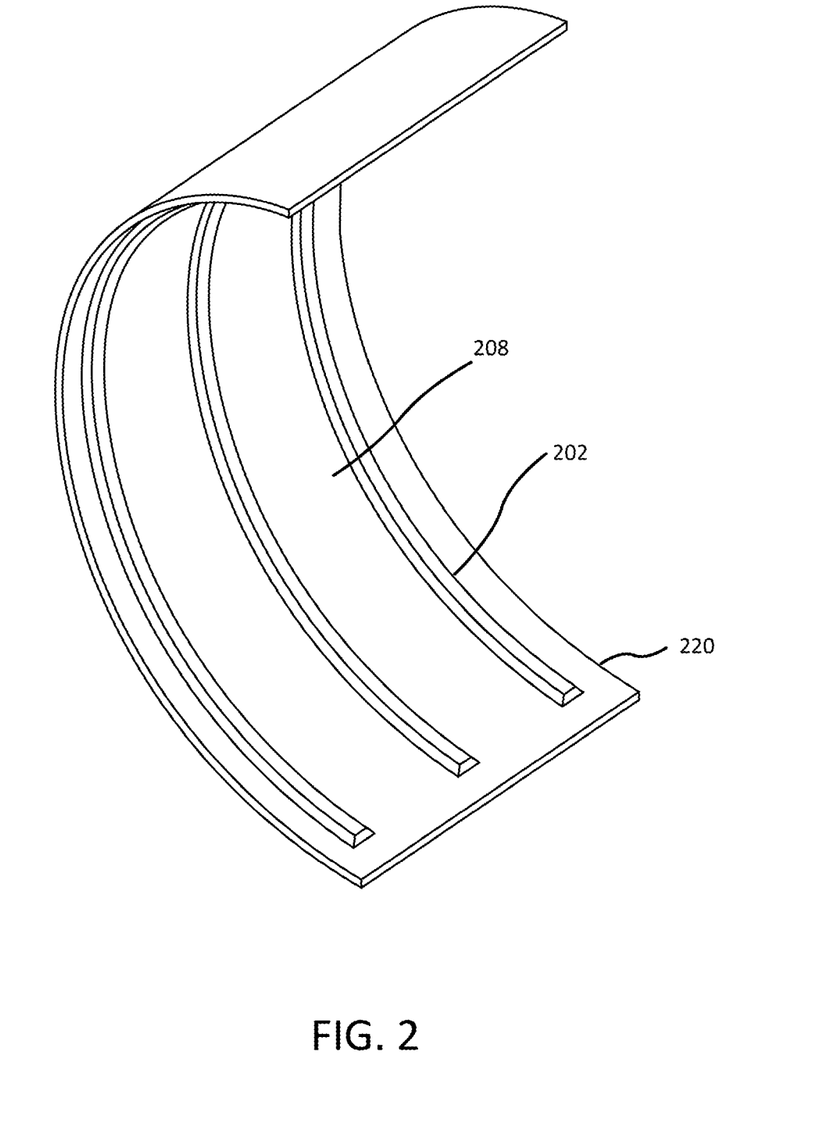
FIG. 2 illustrates an interior view of a fan cowl with stiffeners, in accordance with various embodiments.

Referring to FIG. 2, a portion of an aircraft fan cowl 220 is illustrated according to various embodiments. In various embodiments, the fan cowl 220 can be comprised of a metallic material, a thermoplastic, a thermoplastic composite material, or the like. In various embodiments, the fan cowl 220 can be a thermoplastic composite structure. In such embodiments, the fan cowl 220 can include at least one stiffener 202 formed along an inner surface or skin 208 of the fan cowl 220. The stiffener 202 can be formed along the skin 208 according to any desirable orientation, geometry, or symmetry, including, for example, a fully interconnected grid stiffening symmetry. A stiffener 202 in a fan cowl 220 is described, however, the stiffener 202 can be utilized in any other suitable aircraft structure, including for example, a fuselage, a wing, panels and substructures thereof, and the like. In various embodiments, stiffeners as disclosed herein can be comprised of a thermoplastic, a thermoplastic composite material, a metallic material, or the like. Stiffener 202 comprises a thermoplastic composite material.

Although FIG. 1. and FIG. 2 may disclose stiffeners used within fan cowls, various embodiments of the below referenced methods and system can be applied to any other thermoplastic composite structures within a nacelle. In various embodiments, the below referenced methods and systems can be applied to an inlet inner barrel, a translating sleeve, and an inner fixed structure.

Figure 3:
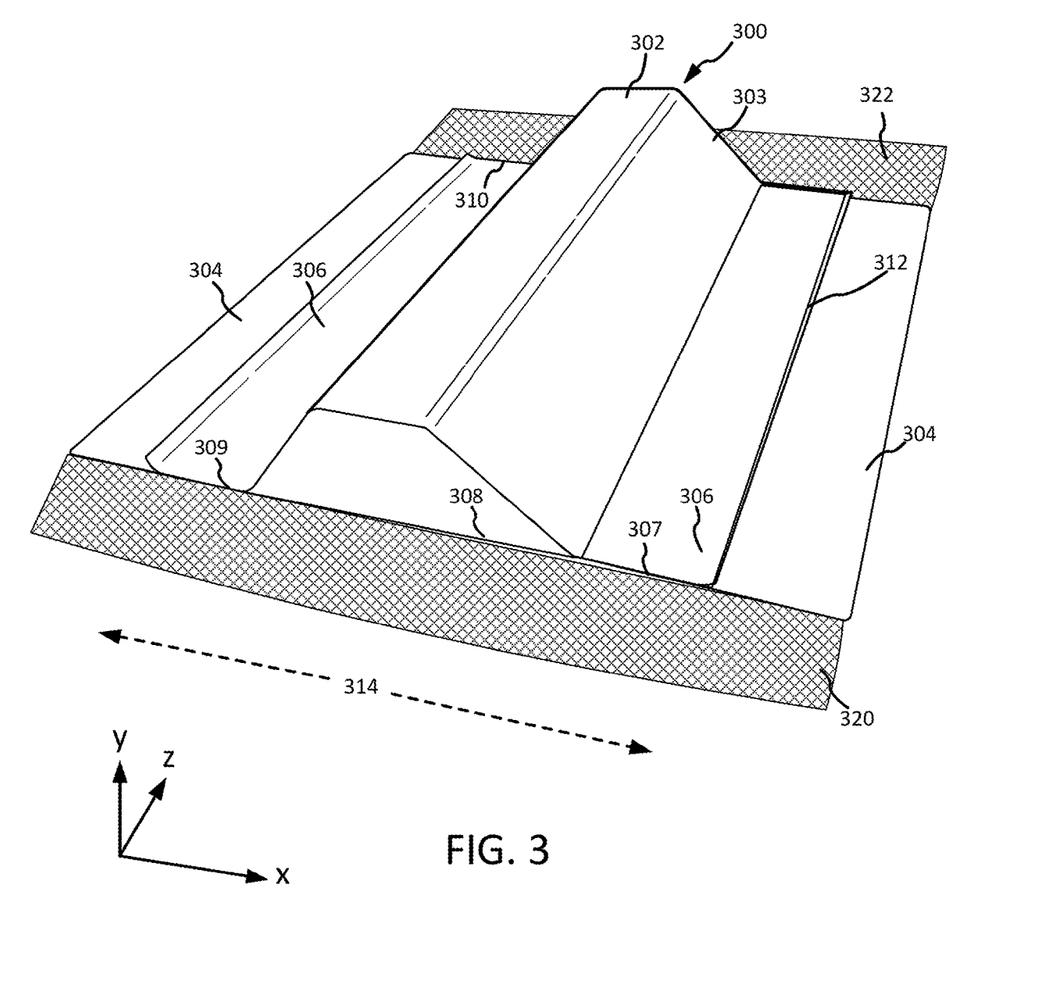
FIG. 3 illustrates an offset view of a stiffener overlaying a thermoplastic composite and a removable metal mask overlaying the thermoplastic composite, in accordance with various embodiments.

In reference to FIG. 3, a first workpiece shown as a thermoplastic composite structure 304 can be coupled to a second workpiece shown as a stiffener 300 using an induction welding process. In various embodiments, stiffeners as disclosed herein can be comprised of a thermoplastic, a thermoplastic composite material, a metallic material, or the like. Stiffener 300 comprises a thermoplastic composite material. The stiffener 300 can comprise a stiffener width 314 and a stiffener length 312. The stiffener width 314 and the stiffener length 312 can form a perimeter of the stiffener 300.

In various embodiments, the thermoplastic composite structure 304 can further comprise a thermoplastic composite skin 308. The stiffener 300 can further comprise a stiffener cap 302 and a stiffener web 303 disposed along the length of the stiffener cap 302. In various embodiments, the stiffener web 303 may be offset along the y-axis from a surface of thermoplastic composite skin 308, for example, at a substantially 45-degree angle. In various embodiments, the stiffener web 303 may be offset from the thermoplastic composite skin 308 at any desirable angle, or any angle suitable for reinforcing a thermoplastic composite structure. The stiffener 300 can further comprise a stiffener flange 306 disposed outward in the positive x-direction from the stiffener web 303. The stiffener can further comprise a first edge 309 and a second edge 310.

In various embodiments, the stiffener flange 306 may be welded to the thermoplastic composite skin 308 at a welding region 307. The thermoplastic composite skin 308 can degrade as the heat generated by induction welding reaches the edges of the stiffener 300. This may be caused by inconsistent eddy currents generated along the thermoplastic composite skin 308, as well as inconsistent heat generation at the welding region 307. In various embodiments, a first removable metal mask 320 can be used in induction welding of the thermoplastic composite structure 304 to the stiffener 300 to reduce the eddy currents produced in the thermoplastic composite structure 304. The first removable metal mask 320 can be positioned adjacent to the first edge 309 of the stiffener 300 in the negative z-direction and on top of the thermoplastic composite structure 304 in the positive y-direction. In various embodiments, a second removable metal mask 322 can be used in induction welding of the thermoplastic composite structure 304 to the stiffener 300 to reduce the eddy currents produced in the thermoplastic composite structure 304. The second removable metal mask 322 can be positioned adjacent to the second edge 310 in the positive z-direction of the stiffener 300 and on top of the thermoplastic composite structure 304 in the positive y-direction.

In various embodiments, both the first removable metal mask 320 and the second removable metal mask 322 can be used during the induction welding process. The first removable metal mask 320 and the second removable metal mask 322 can be equal to or greater in length in the x-direction than the stiffener width 314.

The first removable metal mask 320 and the second removable metal mask 322 can each comprise a metal mesh configured to at least partially overlay the thermoplastic composite structure 304. The metal mesh can function similar to a faraday cage to attenuate the electromagnetic field that induces eddy currents during the induction welding process. This attenuation of the induced eddy currents in these localized areas can help reduce the temperature achieved in those localized areas. A metal mesh with a higher electrical conductivity can result in better attenuation of the electromagnetic field. A metal mesh with higher electrical conductivity can result from a metal mesh with higher density. The density of a metal mesh can be determined by the percentage of metal mass to empty space in the metal mesh. In various embodiments, the electrical conductivity of the metal mesh can be between 1.5 million siemens per meter and 20 million siemens per meter, between 2 million siemens per meter and 15 million siemens per meter, and 2.5 million siemens per meter and 10 million siemens per meter. In various embodiments, the metal mesh can comprise a conductive metal such as copper, aluminum and the like.

Figure 4:
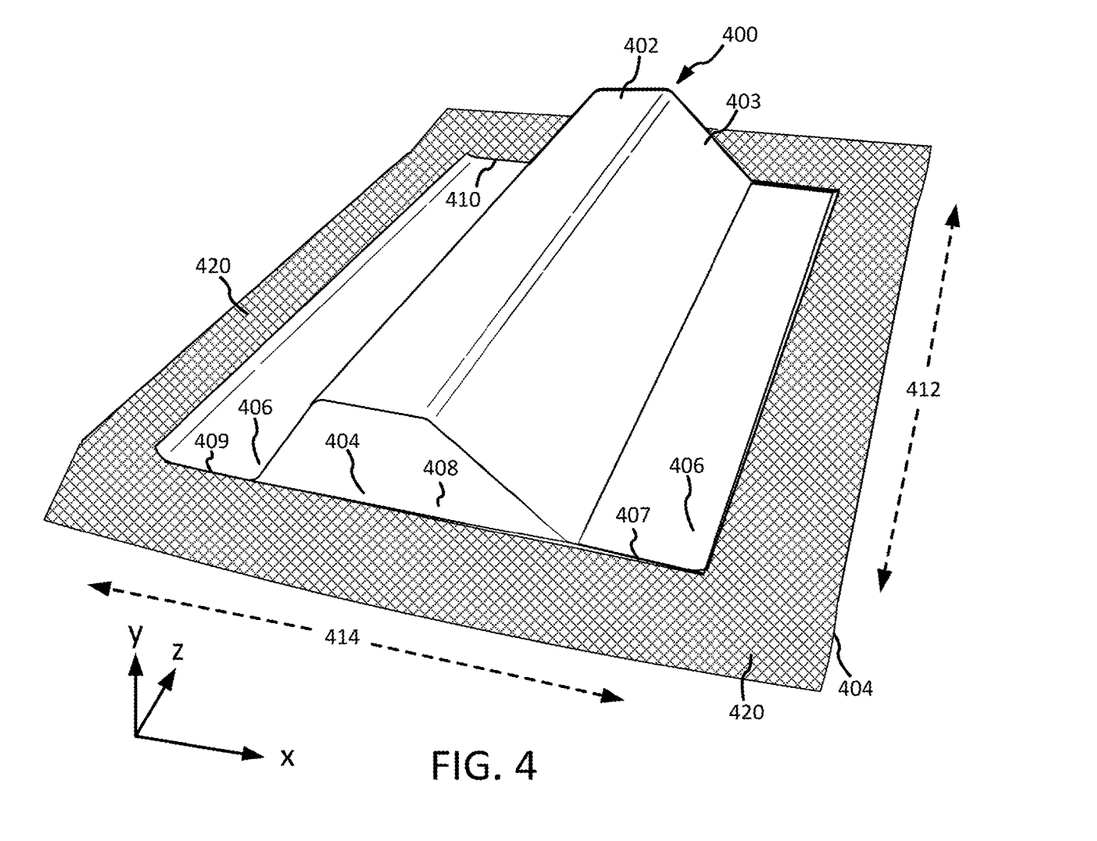
FIG. 4 illustrates an offset view of a stiffener overlaying a thermoplastic composite and a removable metal mask overlaying the thermoplastic composite, in accordance with various embodiments.

In reference to FIG. 4, a first workpiece shown as a thermoplastic composite structure 404 can be coupled to a second workpiece shown as a stiffener 400 using an induction welding process. In various embodiments, stiffeners as disclosed herein can be comprised of a thermoplastic, a thermoplastic composite material, a metallic material, or the like. Stiffener 400 comprises a thermoplastic composite material. The stiffener 400 can comprise a stiffener width 414 and a stiffener length 412. The stiffener width 414 and the stiffener length 412 can form a perimeter of the stiffener 400.

In various embodiments, the thermoplastic composite structure 404 can further comprise a thermoplastic composite skin 408. The stiffener 400 can further comprise a stiffener cap 402 and a stiffener web 403 disposed along the length of the stiffener cap 402. In various embodiments, the stiffener web 403 may be offset along the y-axis from a surface of thermoplastic composite skin 408, for example, at a substantially 45-degree angle. In various embodiments, the stiffener web 403 may be offset from the thermoplastic composite skin 408 at any desirable angle, or any angle suitable for reinforcing a thermoplastic composite structure. The stiffener 400 can further comprise a stiffener flange 406 disposed outward in the positive x-direction from the stiffener web 403. The stiffener can further comprise a first edge 409 and a second edge 410.

In various embodiments, the stiffener flange 406 may be welded to the thermoplastic composite skin 408 at a welding region 407. In various embodiments, a removable metal mask 420 can be used in induction welding of the thermoplastic composite structure 404 to the stiffener 400 to reduce the eddy currents produced in the thermoplastic composite structure 404. In FIG. 4, the removable metal mask 420 is partially covering the thermoplastic composite structure. The removable metal mask 420 can be positioned adjacent to the first edge 409 and the second edge 410, on top of the thermoplastic composite structure 404 in the positive y-direction, such that it masks the thermoplastic composite structure 404 and exposes the stiffener 400. In various embodiments, the length and width of the removable metal mask 420 can greater than the stiffener length 412 and the stiffener width 414, respectively.

The removable metal mask 420 can comprise a metal mesh configured to at least partially overlay the thermoplastic composite structure 404. The metal mesh can have the same properties and composition as previously described for the metal mesh of the first removable metal mask 320 and the second removable metal mask 322.

Figure 5:
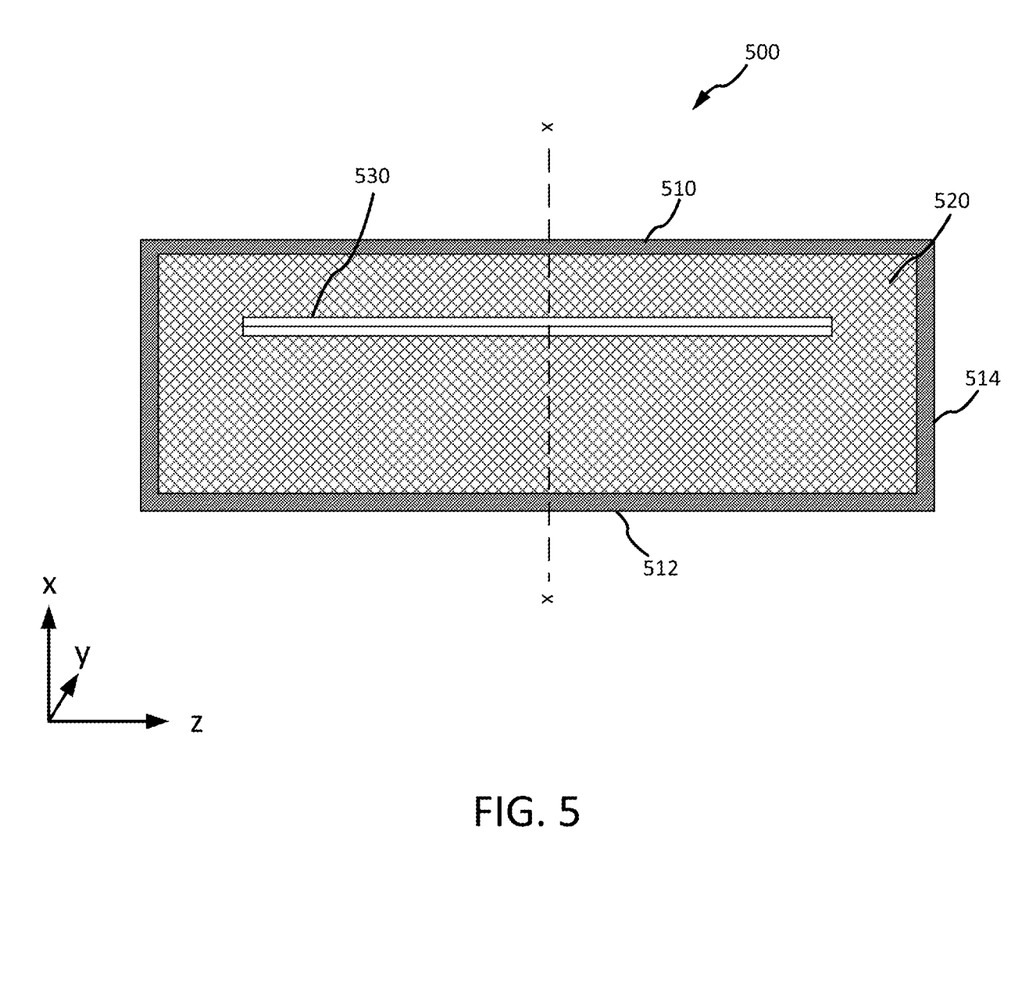
FIG. 5 illustrates a top view of a removeable metal mesh overlaying the thermoplastic composite, in accordance with various embodiments.

In reference to FIG. 5, a removable metal mask 500 used in induction welding of a first workpiece to a second workpiece is shown. In various embodiments, the removable metal mask 500 can comprise a metal mesh 520 and a workpiece opening 530 disposed within the metal mesh 520. The workpiece opening 530 is configured to at least partially mask a portion of the first workpiece and at least partially expose the second workpiece. The metal mesh 520 can have the same properties as described previously for the metal mesh of the first removable metal mask 320.

The workpiece opening 530 can be the same or within 2% of the size of the second workpiece. The metal mesh 520 can be configured to contact each perimeter edge of the second workpiece, such that there may not be any space in the zx-plane between the second workpiece and the removeable metal masks 520.

In various embodiments, the removable metal mask 500 can comprise a metal frame 510. In various embodiments, the metal frame 510 can comprise a metallic material. Exemplary metallic materials for the metal frame 510 include copper, copper alloys, aluminum, aluminum alloys, various iron alloys such as steel and the like. The metal frame 510 can be a solid metal frame or a hollow metal frame. In various embodiments, the metal frame 510 can comprise a frame width 514 and a frame length 512.

In various embodiments, the frame width 514 can be greater than the second workpiece width. In various embodiments, the frame length 512 can be greater than the second workpiece length. Therefore, the workpiece opening 530 can be configured to expose the second workpiece and workpiece opening 530 may cover a portion of the first workpiece. Additionally, the removable metal mask 500, as well as the removable metal masks 320, 322, and 420 can comprise various geometries including a rectangle, a square, a triangle and other shapes of the like.

In various embodiments, the first workpiece can be a thermoplastic composite structure such as thermoplastic composite structures 304 and 404. In various embodiments, the second workpiece can be a stiffener such as stiffeners 300 and 400.

Figure 6A:
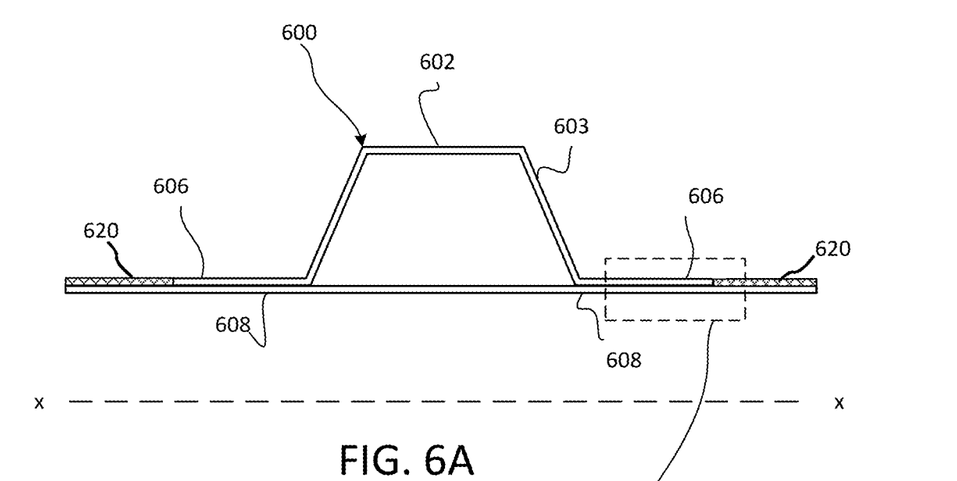
FIG. 6A illustrates a cross-section view of a first workpiece overlayed by a second workpiece along an x-x axis, specifically a thermoplastic composite overlayed by a stiffener, in accordance with various embodiments.
Figure 6B:
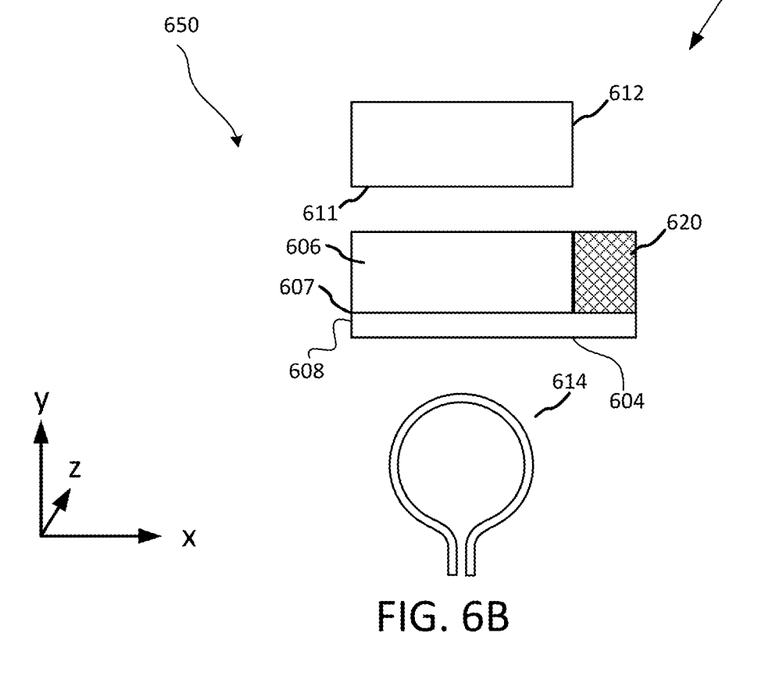
FIG. 6B illustrates a section of the cross-section view of 7A during operation of an induction welding tool, in accordance with various embodiments.
Figure 8:
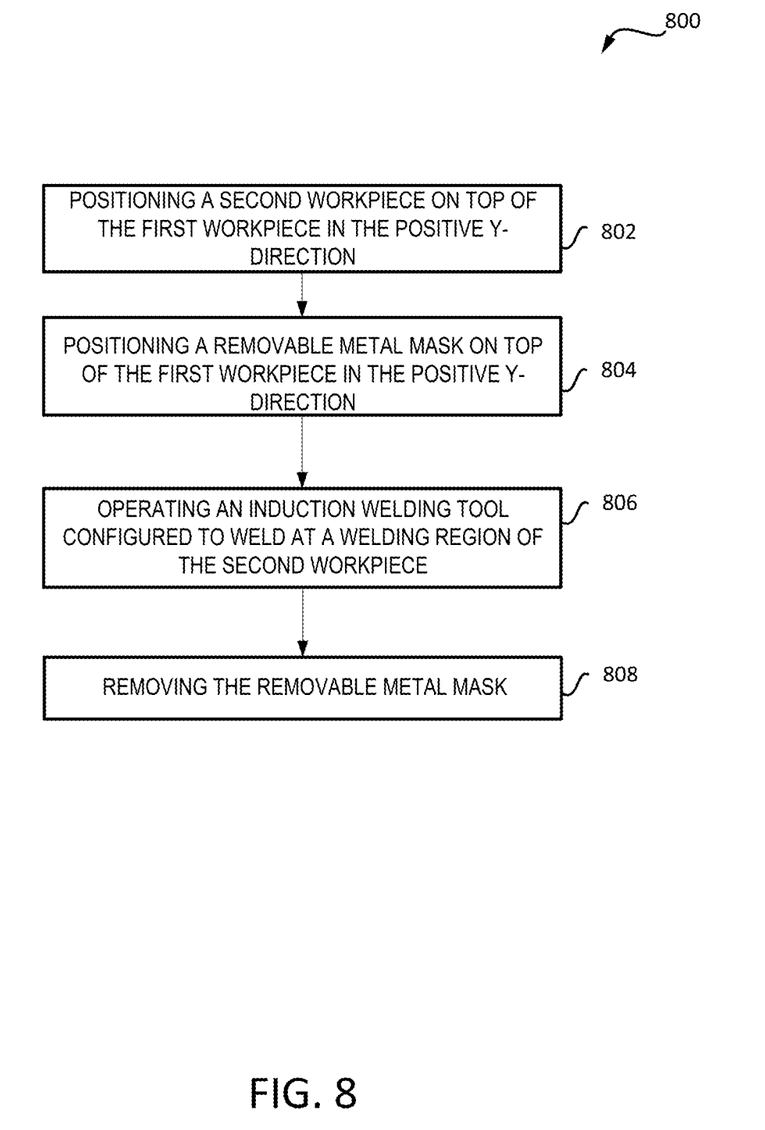
FIG. 8 illustrates a method for induction welding of a stiffener to a thermoplastic component, in accordance with various embodiments.

With reference to FIGS. 6A, 6B, and 8, a cross section along the x-axis of a first workpiece shown as a thermoplastic composite skin 604 and a second workpiece shown as a stiffener 600 during an induction welding process 800. The thermoplastic composite structure 604 can further comprise a thermoplastic composite skin 608. In various embodiments, stiffeners as disclosed herein can be comprised of a thermoplastic, a thermoplastic composite material, a metallic material, or the like. Stiffener 600 comprises a thermoplastic composite material. The stiffener 600 can further comprise a stiffener cap 602 and a stiffener web 603 disposed along the length of the stiffener cap 602. In various embodiments, the stiffener web 603 may be offset along the y-axis from a surface of thermoplastic composite skin 608, for example, at a substantially 45-degree angle. In various embodiments, the stiffener web 603 may be offset from the thermoplastic composite skin 608 at any desirable angle, or any angle suitable for reinforcing a thermoplastic composite structure. The stiffener 600 can further comprise a stiffener flange 606 disposed outward in the positive x-direction from the stiffener web 603.

In various embodiments, the stiffener flange 606 may be welded to the thermoplastic composite skin 608 at a welding region 607 as shown in FIG. 6A. The welding region 607 can be disposed along the entire length or the partial length of the stiffener 600 in the z-direction. In various embodiments, a removable metal mask 620 can be used in induction welding of the thermoplastic composite structure 604 to the stiffener 600. In various embodiments, the removable metal mask 620 can be the removable metal masks described previously as removable metal masks 420 and 520.

In FIG. 6B, a cross-section of an induction welding tool 612 is shown. The induction welding tool 612 may have an induction welding tool surface 611 configured to interact with the stiffener flange 606 and the thermoplastic composite structure 604. The induction welding tool 612 can be located proximate the stiffener flange 606 in the positive y-direction. In various embodiments, a coil 614 can be located proximate the thermoplastic composite structure 604 in the negative y-direction.

In various embodiments, the coil 614 may be configured to energize with electrical current. The energized coil 614 may be configured to generate an electromagnetic field that heats the induction welding tool 612. In various embodiments, the heat generated by the coil 614 may be configured to enable the induction welding tool 612 to weld the stiffener flange 606 to the thermoplastic composite skin 608 at a welding region 607.

With combined reference to FIG. 8, a method 800 for joining a first workpiece to a second workpiece is disclosed. Method 800 includes the steps of positioning a second workpiece (shown as stiffener 600) on top of the first workpiece (shown as thermoplastic composite structure 604) in the positive y-direction (step 802), positioning a removable metal mask 620 on top of the first workpiece (thermoplastic composite structure 604) in the positive y-direction (step 804), operating an induction welding tool 612 configured to weld at a welding region 607 of the second workpiece (step 806), and removing the removable metal mask 620 (step 808). In various embodiments, the first workpiece can be the thermoplastic composite structure 604 and the second workpiece can be the stiffener 600.

In various embodiments, the step 802 can further comprise the stiffener 600 at least partially overlaying the top of the first workpiece. In various embodiments, the step 804 can further comprise the metal mesh, shown in FIGS. 6A and 6B as 620, configured to at least partially mask the thermoplastic composite structure 604 and at least partially expose the stiffener, shown in FIGS. 6A and 6B as 600.

In various embodiments, the induction welding may further comprise operating an induction welding tool 612 configured to weld at the welding region 607 of stiffener 600, wherein an induction welding tool 612 operates for a length of the stiffener 600 in the z-direction for a welding period. The welding period can be adjusted depending on the operational temperature of the welding tool. For example, a welding tool 612 operating at a temperature above 500° C. can have a shorter welding period than a welding tool 612 operating at a temperature below 400° C. In various embodiments, the induction welding tool 612 can comprises an induction welding tool surface 611 located proximate the second workpiece in the positive y-direction.

In various embodiments the induction welding tool 612 can comprise a coil 614 located proximate the first workpiece in the negative y-direction. In various embodiments, the coil 614 can be configured to energize with alternating current to generate an electromagnetic field. The electromagnetic field can be configured to heat the welding region 607, wherein the heat generated by the coil is configured to weld at a welding temperature. In various embodiments, the welding temperature can be between 200° C. and 600° C., between 220° C. and 450° C., and between 250° C. and 400° C. In various embodiments, when the induction welding tool 612 is at the welding temperature, the induction welding tool 612 can weld the stiffener 600 to the thermoplastic composite structure 604 at the welding region 607. In various embodiments, the operating the induction welding tool (step 806) can comprise welding the stiffener flange 606 to the thermoplastic composite skin 608.

Figure 7A:
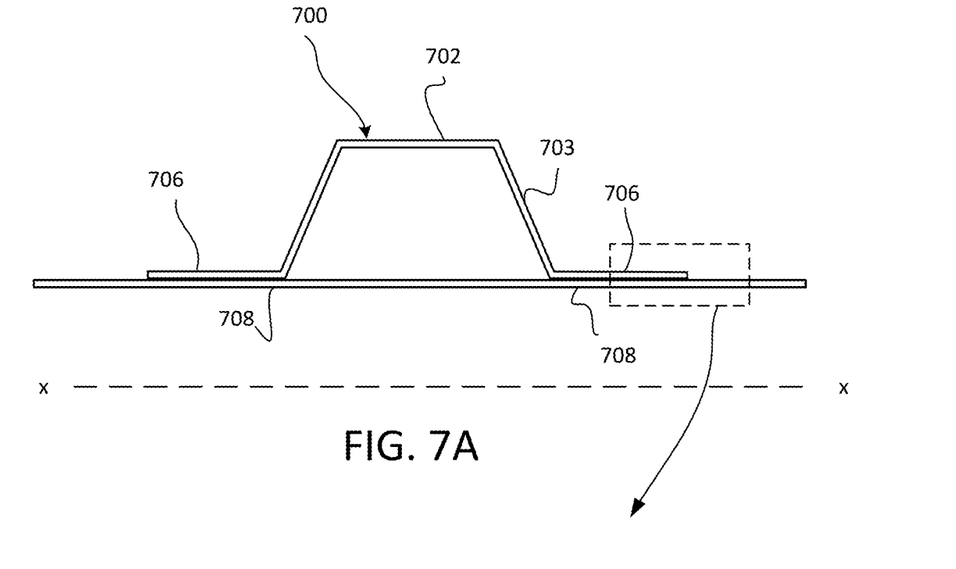
FIG. 7A illustrates a cross-section view of a first workpiece overlayed by a second workpiece along an x-x axis, specifically a thermoplastic composite overlayed by a stiffener, in accordance with various embodiments.
Figure 7B:
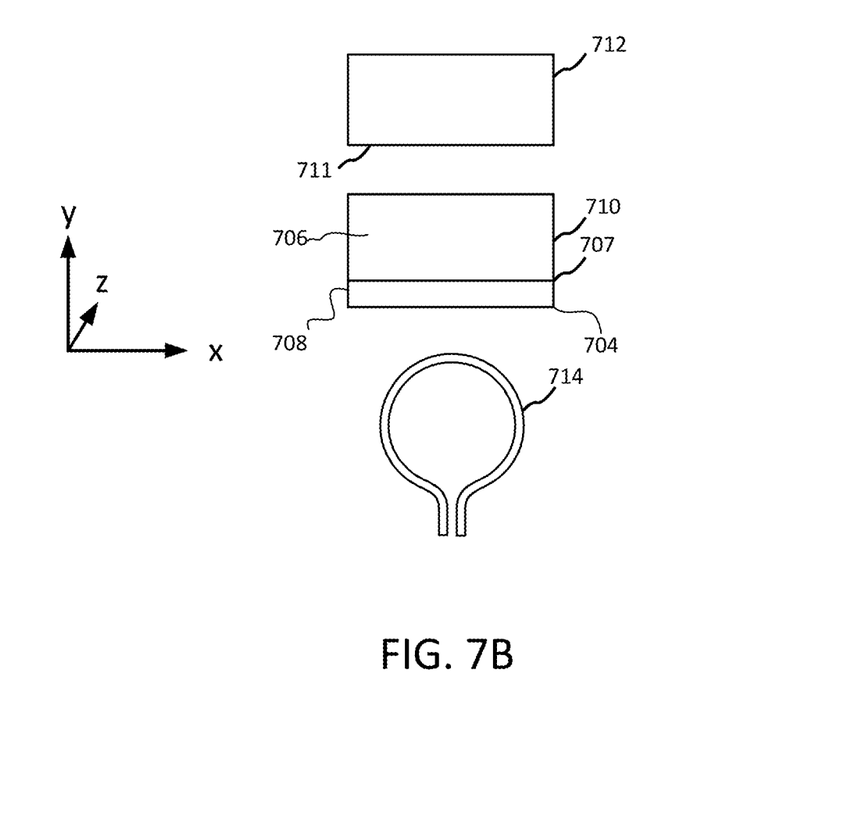
FIG. 7B illustrates a section of the cross-section view of 8A during operation of an induction welding tool, in accordance with various embodiments.
Figure 9:
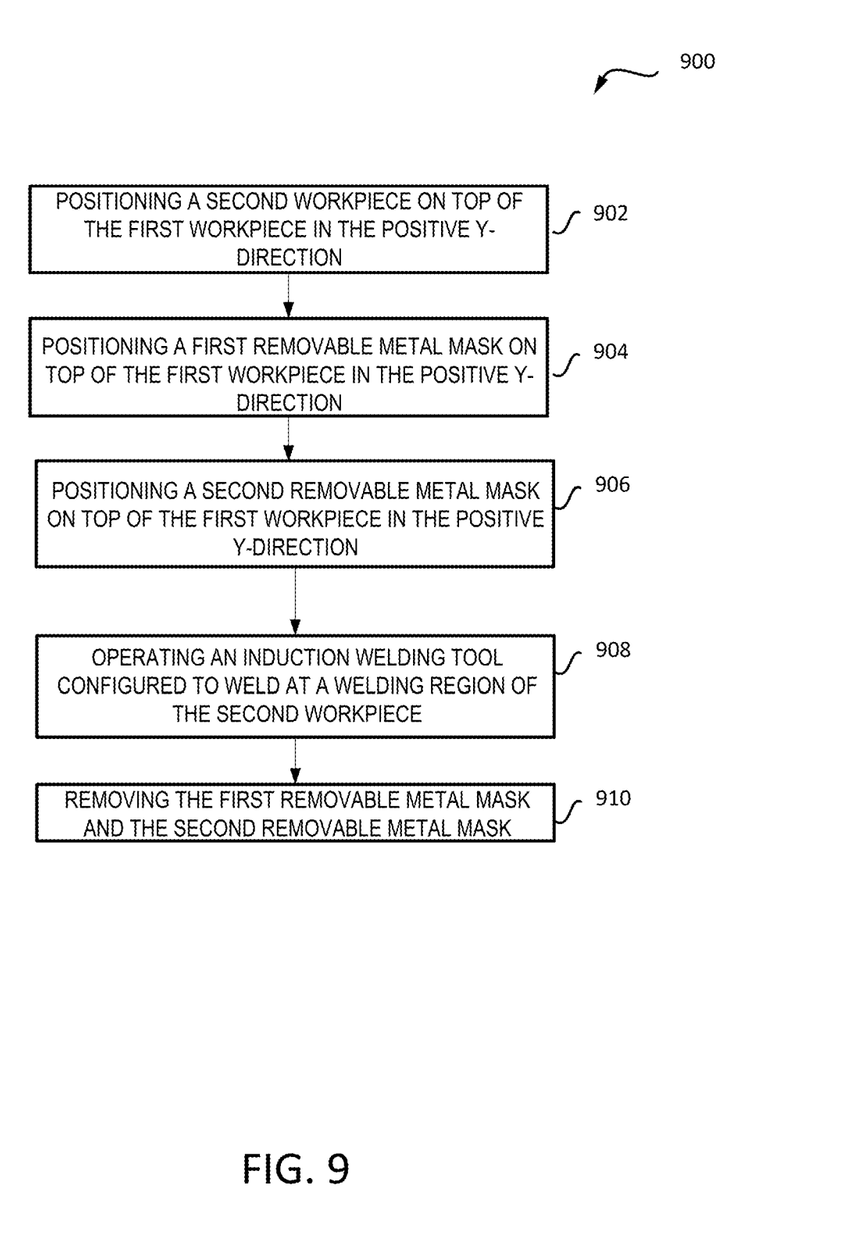
FIG. 9 illustrates a method for induction welding of a stiffener to a thermoplastic component, in accordance with various embodiments.

With reference to FIGS. 7A, 7B and 9, a cross section along the x-axis of a first workpiece shown as a thermoplastic composite structure 704 and a second workpiece shown as a stiffener 700 during an induction welding process 900. The thermoplastic composite structure 704 can further comprise a thermoplastic composite skin 708. In various embodiments, stiffeners as disclosed herein can be comprised of a thermoplastic, a thermoplastic composite material, a metallic material, or the like. Stiffener 700 comprises a thermoplastic composite material. The stiffener 700 can further comprise a stiffener cap 702 and a stiffener web 703 disposed along the length of the stiffener cap 702. In various embodiments, the stiffener web 703 may be offset along the y-axis from a surface of thermoplastic composite skin 708, for example, at a substantially 45-degree angle. In various embodiments, the stiffener web 703 may be offset from the thermoplastic composite skin 708 at any desirable angle, or any angle suitable for reinforcing a thermoplastic composite structure. The stiffener 700 can further comprise a stiffener flange 706 disposed outward in the positive x-direction from the stiffener web 703.

In various embodiments, the stiffener flange 706 may be welded to the thermoplastic composite skin 708 at a welding region 707 as shown in FIG. 7A. The welding region 707 can be disposed along the entire length or the partial length of the stiffener 700 in the z-direction. In various embodiments, a first removable metal mask and a second removable metal mask can be used in induction welding of the thermoplastic composite structure 704 to the stiffener 700. The first removable metal mask and the second removable metal mask cannot be seen from the cutaway view in FIGS. 7A and 7B as they extend along the zx-plane. However, in various embodiments, the first removable metal mask can be the removable metal mask 320 and the second removable metal mask can be the removable metal mask 322 as described previously.

In FIG. 7B, a cross-section of an induction welding tool 712 is shown. The induction welding tool 712 may have an induction welding tool surface 711 configured to interact with the stiffener flange 706 and the thermoplastic composite structure 704. The induction welding tool 712 can be located proximate the stiffener flange 706 in the positive y-direction. In various embodiments, a coil 714 can be located proximate the thermoplastic composite structure 704 in the negative y-direction.

In various embodiments, the coil 714 may be configured to energize with electrical current. The energized coil 714 may be configured to generate an electromagnetic field that heats the induction welding tool 712. In various embodiments, the heat generated by the coil 714 may be configured to enable the induction welding tool 712 to weld the stiffener flange 706 to the thermoplastic composite skin 708 at a welding region 707.

With reference to FIG. 9, a method 900 for joining a first workpiece to a second workpiece is disclosed. Method 900 includes the steps of positioning a second workpiece (shown as stiffener 700) on top of the first workpiece (shown as thermoplastic composite structure 704) in the positive y-direction (step 902), positioning a first removable metal mask on top of the first workpiece (thermoplastic composite structure 704) in the positive y-direction (step 904), positioning a second removable metal mask on top of the first workpiece (thermoplastic composite structure 704) in the positive y-direction (step 906), operating an induction welding tool 712 configured to weld at a welding region 707 of the second workpiece (stiffener 700) (step 908), and removing the first removable metal mask and the second removable metal mask (step 910). In various embodiments, the first workpiece can be the thermoplastic composite structure 704 and the second workpiece can be the stiffener 700.

In various embodiments, the step 902 can further comprise the stiffener 700 at least partially overlaying the top of the first workpiece. In various embodiments, the step 904 can further comprise the first removable metal mask comprising a metal mesh as described for the first removable metal mask 320, configured to at least partially mask the thermoplastic composite structure 704. In various embodiments, the step 906 can further comprise the second removable metal mask comprising a metal mesh as described for the second removable metal mask 322, configured to at least partially mask the thermoplastic composite structure 704.

In various embodiments, the induction welding may further comprise operating an induction welding tool 712 configured to weld at the welding region 707 of stiffener 700, wherein an induction welding tool 712 operates for a length of the stiffener 700 in the z-direction for a welding period. The welding period can be adjusted depending on the operational temperature of the welding tool. For example, a welding tool 712 operating at a temperature above 500° C. can have a shorter welding period than a welding tool 612 operating at a temperature below 400° C. In various embodiments, the induction welding tool 612 can comprises an induction welding tool surface 711 located proximate the second workpiece in the positive y-direction.

In various embodiments the induction welding tool 712 can comprise a coil 714 located proximate the first workpiece in the negative y-direction. In various embodiments, the coil 714 can be configured to energize with alternating current to generate an electromagnetic field. The electromagnetic field can be configured to heat the welding region 707, wherein the heat generated by the coil is configured to weld at a welding temperature. In various embodiments, the welding temperature can be between 200° C. and 600° C., between 220° C. and 450° C., and between 250° C. and 400° C. In various embodiments, when the induction welding tool 712 is at the welding temperature, the induction welding tool 712 can weld the stiffener 700 to the thermoplastic composite structure 704 at the welding region 707. In various embodiments, the operating the induction welding tool (step 906) can comprise welding the stiffener flange 706 to the thermoplastic composite skin 708.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 36 U.S.C. 112(f) unless the element is expressly recited using the phrase "means for." As used herein, the terms "comprises", "comprising", or any other variation thereof, are intended to cover a non-exclusive inclusion, such that a process, method, article, or that comprises a list of elements does not include only those elements but may include other elements not expressly listed or inherent to such process, method, article, or apparatus.

The invention claimed is:

1. A method of joining a first workpiece to a second workpiece, the method comprising:
   positioning the second workpiece on a top of the first workpiece, wherein the second workpiece is configured to at least partially overlay the top of the first workpiece;
   positioning a removable metal mask on the top of the first workpiece, wherein the removable metal mask comprises a metal frame and a metal mesh disposed within the metal frame, the metal mesh is configured to mask the first workpiece and expose the second workpiece through a workpiece opening disposed within the metal mesh;
   induction welding the first workpiece to the second workpiece at a welding region, wherein the induction welding further comprises:
      operating an induction welding tool configured to weld at the welding region of the second workpiece, wherein an induction welding tool operates for a length of the second workpiece for a welding period, wherein the induction welding tool comprises:
         an induction welding tool surface located proximate the second workpiece, and
         a coil located proximate the first workpiece, wherein the coil is configured to energize with alternating current to generate an electromagnetic field, wherein the electromagnetic field is configured to heat the welding region, wherein the heat generated by the coil is configured to weld at a welding temperature, by the induction welding tool, the second workpiece to the first workpiece at the welding region; and
   removing the removable metal mask.

2. The method of claim 1, wherein the metal mesh comprises an electrical conductivity between 1.5 million siemens per meter and 20 million siemens per meter.

3. The method of claim 2, wherein the metal mesh comprises at least one of copper and aluminum.

4. The method of claim 3, wherein the welding temperature is between 200° C. and 500° C.

5. The method of claim 4, wherein the induction welding the first workpiece to the second workpiece further comprises induction welding a thermoplastic composite structure to the second workpiece, wherein the thermoplastic composite structure further comprises a thermoplastic composite skin, wherein the thermoplastic composite skin is configured to weld to the second workpiece.

6. The method of claim 5, wherein the induction welding the thermoplastic composite structure to the second workpiece further comprises induction welding the thermoplastic composite structure to a stiffener, wherein the stiffener comprises:
   a stiffener cap;
   a stiffener web disposed along the length of the stiffener cap; and
   a stiffener flange disposed outward from the stiffener web, wherein the stiffener flange overlays the thermoplastic composite skin.

7. The method of claim 6, wherein the induction welding the stiffener flange to the thermoplastic composite structure further comprises the stiffener flange at least partially overlaying the thermoplastic composite skin of the thermoplastic composite structure, wherein the stiffener flange is configured to weld to the thermoplastic composite skin of the thermoplastic composite structure at the welding region.

8. The method of claim 7, wherein the induction welding the stiffener flange to the thermoplastic composite structure further comprises the electromagnetic field configured to heat the stiffener flange and the thermoplastic composite skin at the welding region, wherein the heat generated by the coil is configured to weld, by the induction welding tool, the stiffener flange to the thermoplastic composite skin at the welding region.

9. The method of claim 1, wherein:
the induction welding tool surface is located proximate the second workpiece such that the second workpiece is located between the first workpiece and the induction welding tool surface; and
the coil is located proximate the first workpiece such that the first workpiece is located between the second workpiece and the coil.

10. A method of joining a first workpiece to a second workpiece, the method comprising:
positioning the second workpiece on a top of the first workpiece, wherein the second workpiece is configured to at least partially overlay the top of the first workpiece;
positioning a removable metal mask on the top of the first workpiece, wherein the removable metal mask comprises a metal mesh configured to mask the first workpiece and expose the second workpiece through a workpiece opening disposed within the metal mesh;
induction welding the first workpiece to the second workpiece at a welding region, wherein the induction welding further comprises:
operating an induction welding tool configured to weld at the welding region of the second workpiece, wherein an induction welding tool operates for a length of the second workpiece for a welding period, wherein the induction welding tool comprises:
an induction welding tool surface located proximate the second workpiece such that the second workpiece is located between the first workpiece and the induction welding tool surface, and
a coil located proximate the first workpiece such that the first workpiece is located between the second workpiece and the coil, wherein the coil is configured to energize with alternating current to generate an electromagnetic field, wherein the electromagnetic field is configured to heat the welding region, wherein the heat generated by the coil is configured to weld at a welding temperature, by the induction welding tool, the second workpiece to the first workpiece at the welding region; and
removing the removable metal mask.

11. The method of claim 10, wherein the metal mesh comprises an electrical conductivity between 1.5 million siemens per meter and 20 million siemens per meter.

12. The method of claim 11, wherein the metal mesh comprises at least one of copper and aluminum.

13. The method of claim 12, wherein the welding temperature is between 200° C. and 500° C.

14. The method of claim 13, wherein the induction welding the first workpiece to the second workpiece further comprises induction welding a thermoplastic composite structure to the second workpiece, wherein the thermoplastic composite structure further comprises a thermoplastic composite skin, wherein the thermoplastic composite skin is configured to weld to the second workpiece.

15. The method of claim 14, wherein the induction welding the thermoplastic composite structure to the second workpiece further comprises induction welding the thermoplastic composite structure to a stiffener, wherein the stiffener comprises:
a stiffener cap;
a stiffener web disposed along the length of the stiffener cap; and
a stiffener flange disposed outward from the stiffener web, wherein the stiffener flange overlays the thermoplastic composite skin.

16. The method of claim 15, wherein the induction welding the stiffener flange to the thermoplastic composite structure further comprises the stiffener flange at least partially overlaying the thermoplastic composite skin of the thermoplastic composite structure, wherein the stiffener flange is configured to weld to the thermoplastic composite skin of the thermoplastic composite structure at the welding region.

17. The method of claim 16, wherein the induction welding the stiffener flange to the thermoplastic composite structure further comprises the electromagnetic field configured to heat the stiffener flange and the thermoplastic composite skin at the welding region, wherein the heat generated by the coil is configured to weld, by the induction welding tool, the stiffener flange to the thermoplastic composite skin at the welding region.

* * * * *